United States Patent [19]

Savio

[11] Patent Number: 5,617,804
[45] Date of Patent: Apr. 8, 1997

[54] CONVEYING DEVICE FOR FEEDING TEXTILE ARTICLES FROM MULTIPLE FEED STATIONS

[75] Inventor: Ferruccio Savio, Milan, Italy

[73] Assignee: Savio Macchine S.p.A., Milan, Italy

[21] Appl. No.: 568,972

[22] Filed: Dec. 7, 1995

[30] Foreign Application Priority Data

Dec. 27, 1994 [IT] Italy ................................. MI94A2651

[51] Int. Cl.⁶ ................................................. D05B 27/14
[52] U.S. Cl. ....................... 112/304; 198/369.2; 271/9.13
[58] Field of Search ............................. 198/369.1, 369.2, 198/369.3; 112/304; 271/9.02, 9.01, 9.13

[56] References Cited

U.S. PATENT DOCUMENTS 3,175,821  3/1965  Gibson ................................. 271/9.13
4,166,525  9/1979  Bruno ................................... 198/369.2
4,978,112  12/1990  Yokoi ................................... 271/9.02

*Primary Examiner*—Andy Falik
*Attorney, Agent, or Firm*—Oblon, Spivak, McClelland, Maier & Neustadt, P.C.

[57] ABSTRACT

A device for conveying, to a final station, loose textile articles fed selectively by at least two feed stations. At each feed station and at the final station, fixed guides in the form of pairs of conveyor belts are located, and, at each point of convergence of the guides, a movable structure is provided enabling the textile articles to be conveyed from the feed stations to the final station.

5 Claims, 2 Drawing Sheets

CONVEYING DEVICE FOR FEEDING TEXTILE ARTICLES FROM MULTIPLE FEED STATIONS

BACKGROUND OF THE INVENTION

1. Field of the Invention

This invention relates to a device for conveying textile articles, for example men's socks, from at least two feed stations to a final station, said stations being for example sock forming machines and, respectively, a sock finishing machine and in particular a machine for sewing the toe of the socks and for turning them inside out. The socks are usually brought to the finishing machine in groups contained in bags or in carriage-mounted boxes. The socks are then inserted one by one along a slot in a usual guide element provided in known finishing machines and comprising pairs of mutually facing belts arranged to move the socks along the slot so as to bring the socks up to the various finishing members of the machine.

2. Discussion of the Background

The aforedescribed production system requires the presence of control personnel both for the sock forming machines and for the finishing machine. The system also involves relatively lengthy idle times in that the socks have firstly to be collected, then conveyed to the finishing machine in groups, and manually inserted into the guide element thereof.

SUMMARY OF THE INVENTION

An object of the present invention is to provide a device for automatically conveying textile articles from several feed stations to a final station, which both enables the personnel assigned to the stations to be reduced and optimized which accelerates the feed of textile articles to the final station.

A further object is to provide a device of the aforesaid type which can be easily adapted to existing stations, is of simple and reliable operation and is of low cost.

These and further objects which will be apparent to an expert of the art are attained by a device in accordance with the accompanying claims.

DESCRIPTION OF THE DRAWINGS

The present invention will be more apparent from the accompanying drawings, which are provided by way of non-limiting example and in which.

DESCRIPTION OF THE PREFERRED EMBODIMENT

Figure 1:
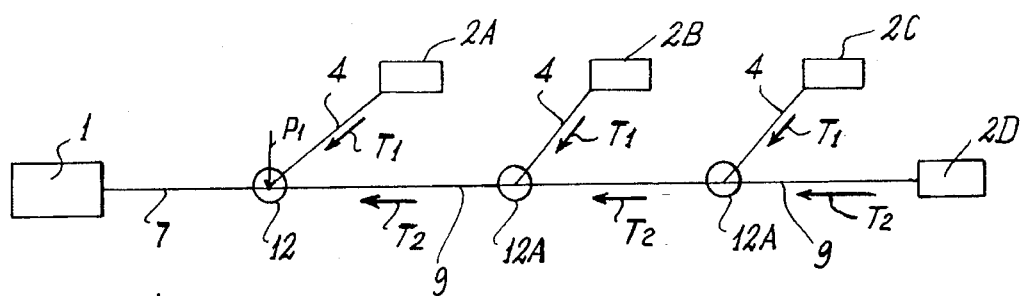
FIG. 1 shows the device according to the invention.

The figures show a device for conveying textile articles (not shown) from at least two feed stations 2A, 2B, 2C, 2D (four being shown in FIG. 1) to a final station 1 (FIG. 1). The textile articles can be for example men's socks, in which case the feed stations are men's sock forming machines, and the final station is a conventional sock finishing machine, for example of the type for sewing its toe and then turning it inside out.

Figure 3:
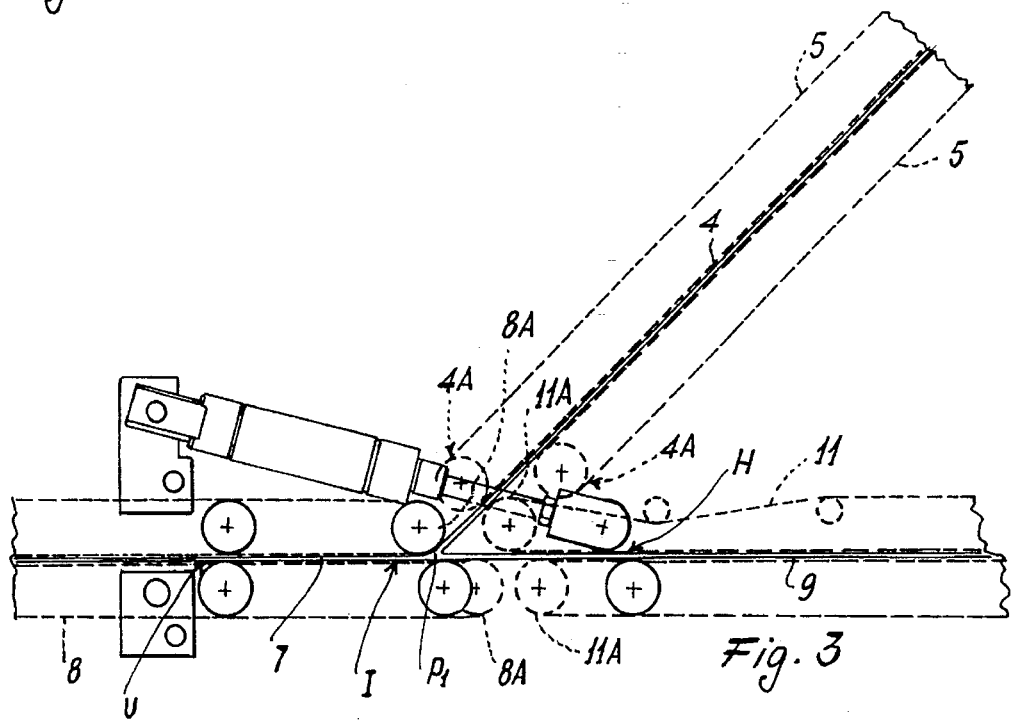
FIG. 3 is a simplified plan view of the part shown in FIG. 2, but in a different position and with certain parts omitted.

At each feed station 2A–D there is provided a first fixed guide 3 comprising a longitudinal guide slot 4 for the socks (not shown), and a first pair of mutually facing conveyor belts 5 for conveying the socks along the slot 4, the sock advancement trajectory being indicated by the arrow T1. Advantageously the exit ends 5A of the belts 5 are mutually offset, as shown in FIG. 3. The belts 5 are positioned below the surface 3A of the guide and are driven and supported in a manner conventional to the expert of the art.

The socks leaving the feed station 2A are inserted manually into the slot 4 such that a portion of their free elastic edge projects upwardly from the guide 3, the remaining part of the sock remaining hanging below the surface 3A of the guide.

At the final station 1 (FIG. 1) there is provided a second fixed guide 6 comprising a longitudinal guide slot 7 for the socks and a second pair of mutually facing conveyor belts 8 for conveying the socks along the slot 7. Their advancement trajectory is indicated by T2. Advantageously, the entry ends 8A of the belts 8 are mutually offset (FIG. 3).

The belts 8 are positioned below the surface 6A of the guide and are driven and supported in a conventional manner. By virtue of the belts 8, the socks are conveyed automatically to the final station 1 where, by means of conventional belts and a guide element similar to those already described, they are moved up to the various actuator members for the processes to which the socks are to be subjected.

Figure 2:
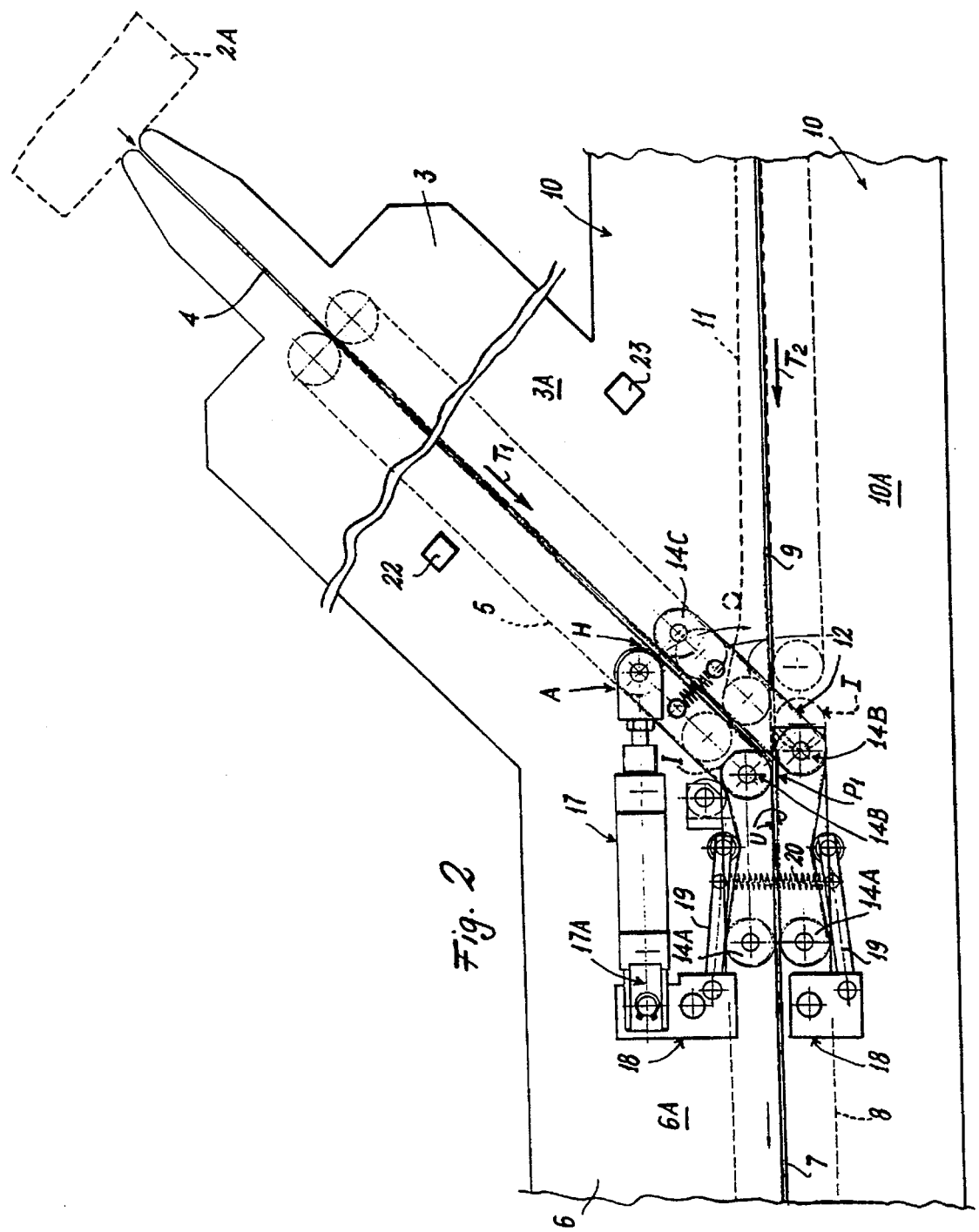
FIG. 2 is a schematic plan view of a part thereof indicated by the arrow Z in FIG. 1.

As shown in FIGS. 2 and 3, the slot 4 in the guide 3 of the feed station 2A communicates with the slot 7 in the guide 6 of the final station at a convergence point P1. Into the point P1 there also converges a slot 9 of a supplementary guide 10 along which, as described hereinafter, socks originating from other feed stations can travel, driven by a supplementary pair of conveyor belts 11. The exit ends 11A of the supplementary belts are advantageously mutually offset with respect to one another.

At said convergence point P1 there is provided a movable structure 12 (FIGS. 2 and 4) comprising a third pair of mutually facing conveyor belts 13 (not shown in FIG. 3), having their exit end U substantially aligned with and partly overlying the entry end I of the second pair of belts 8.

Figure 4:
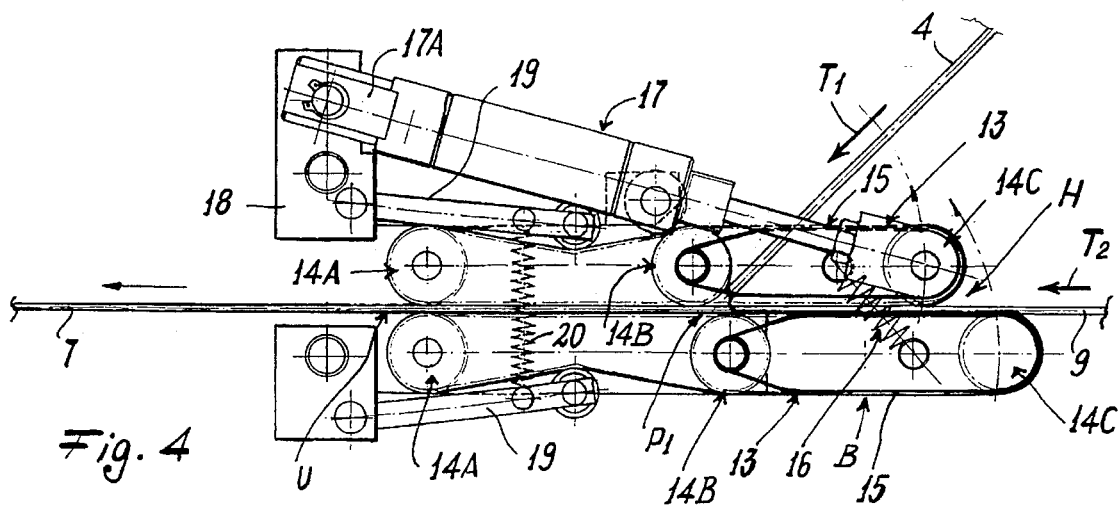
FIG. 4 is a schematic plan view of a detail of the part shown in FIG. 2.

More specifically, as shown in FIG. 4, the belts 13 are each driven and supported by three pairs of rollers 14A, B, C provided on the upper side of the surfaces 6A, 3A and 10A (FIG. 2) of the respective guides 6, 3 and 10. The pairs of rollers 14A and B are secured to the surface 6A in a conventional manner, in a fixed position such that a first portion of the belts 13 is parallel and close to the slot 7 and is able to drag the socks originating from the belts 5 or 11 towards the belts 8. The other pair of rollers 14C is movable between two positions (A in FIG. 2, B in FIG. 4) such that the entry end H of the belts 13 can align with one the other of the exit ends of the first pair of belts 5 or of the supplementary belts 11.

Each of the rollers 14C is secured in a conventional manner to one end of a plate 15, these being hinged coaxially to the rollers 14B and connected together by a spring 16. To one end of the plates 15 there is also secured a member 17, which in the illustrated example is a hydraulic or pneumatic cylinder-piston unit arranged to move both the plates, and hence the rollers 14C secured to them, selectively into the two said positions A and B (FIGS. 2, 3). The end 17A of the member 17 is secured to a fixed support 18. Arms 19, connected together by a spring 20, are also hinged to the support 18 to maintain the belts 13 under tension.

The guide 10 (FIG. 2) and the pair of belts 11 can communicate directly with the exit of a second feed station (2D in FIG. 1) in a manner similar to that described for the guide 3 or, as schematically represented in FIG. 1, they can be connected to the exit of intermediate movable structures 12A. In this manner a system can be created for bringing to a final station 1 textile articles originating from n feed stations (2A–D).

The device according to the invention comprises a control unit for controlling the movement of the pairs of belts 5, 8, 13 and 11 and of the members 17 for driving the movable structures 12, 12A. The control unit is advantageously of the microprocessor type and will not be described hereinafter as it is conventional to one skilled in the art. The control unit is connected to usual sensors 23, 22 (FIG. 2), for example of the photoelectric cell type, able to sense, respectively, the position of the movable structures 12, 12A, and when a textile article leaving one of the feed stations reaches a predetermined position along the guide slots 4.

On the basis of the signals originating from said sensors, the control unit powers the usual motor units (not shown but conventional) for driving the various pairs of conveyor belts of the device. It should be noted that all the belts of the device are driven at the same velocity and that, for driving them, a single drive unit can be used connected by conventional transmission members to the drive rollers of the belts.

More specifically, if for example a certain number of textile articles are to be conveyed automatically from the feed station 2B (FIG. 1) to the final station 1, the control unit firstly drives the pair of belts 5 relative to the guide 3 associated with the station 2B. The articles inserted manually along the relative slot 4 of said guide 3 are driven by the belts 5 along the slot as far as a predetermined point. When this point is reached, the control unit checks via the sensor 22 whether the relative movable structure is positioned so as to be able to receive the textile articles (position A, FIG. 2). If not, the control unit blocks the advancement of the articles along the guide 3 until the structure has been moved into the correct position. If it is in the correct position, the control unit also checks whether the movable structure 12 downstream of that relative to the station 2B is in the correct position (B, FIG. 4) for conveying the articles towards the final station, and only if this is so are the articles conveyed directly from the station 2B to the final station 1. If this is not so, the articles are halted in a waiting position along the guide 3 until the station 12 downstream is also in the correct position for discharging the articles.

Advantageously, the articles are discharged from the feed stations to the final stations in groups.

The velocity of the conveyor belts is for example one or two meters per minute.

Finally, it should be noted that the described embodiment is provided by way of example, and that numerous modifications are possible all falling within the same inventive concept. In particular, the device could be made to operate in the opposite manner to that described, ie to direct the textile articles from the final station 1 to at least two feed stations 2A–D.

I claim:

1. A device for conveying textile articles from at least two feed stations to a final station, which comprises:

a first fixed guide, located at each feeding station, comprising a first pair of mutually facing conveyor belts gripping said articles and dragging them along said first guide, a second fixed guide located at said final station and having a second pair of conveying belts similar to the first pair of belts, said second pair of belts conveying said articles originating from said feed stations towards said final station along said second guide, said first fixed guide communicating with said second fixed guide at a point of convergence, a movable structure located at said point of convergence and comprising a third pair of conveyor belts similar to the first pair of belts and having exit ends substantially aligned with entry ends of said second pair of belts, a member selectively moving said movable structure between at least two positions in which an entry end of said third pair of belts is substantially aligned with an exit end of one of said first pair of belts, a control member selectively halting said first pair of belts if, on arrival of a textile article in a predetermined position along said first guide, the entry end of said third pair of belts is not aligned with the exit end of said first pair of belts.

2. A device as claimed in claim 1, wherein said at least two feed stations comprise a plurality of feed stations communicating with the second pair of belts of the final station via the movable structure and a pair of supplementary belts, the control member maintaining said third pair of belts aligned with said first pair of belts.

3. A device as claimed in claims 1 or 2, wherein the first fixed guide and the second fixed guide are coplanar.

4. A device as claimed in claims 1 or 2, which comprises sensors sensing the position of the movable structure and determining whether a textile article is positioned in a predetermined position along said first guide.

5. A device as claimed in claims 1 or 2, wherein a direction of rotation of said pairs of belts is controlled to transfer the textile articles from the feed stations to the final station or vice versa.

* * * * *

UNITED STATES PATENT AND TRADEMARK OFFICE
CERTIFICATE OF CORRECTION

PATENT NO. : 5,617,804
DATED : APRIL 8, 1997
INVENTOR(S) : SAVIO

It is certified that error appears in the above-identified patent and that said Letters Patent is hereby corrected as shown below:

Column 2, line 56, after "one", insert --or--.

Signed and Sealed this

Fifth Day of May, 1998

Attest:

BRUCE LEHMAN

*Attesting Officer*  *Commissioner of Patents and Trademarks*